(12) United States Patent
Ackermann et al.

(10) Patent No.: US 10,803,100 B2
(45) Date of Patent: Oct. 13, 2020

(54) TAGGING NAMED ENTITIES WITH SOURCE DOCUMENT TOPIC INFORMATION FOR DEEP QUESTION ANSWERING

(71) Applicant: INTERNATIONAL BUSINESS MACHINES CORPORATION, Armonk, NY (US)

(72) Inventors: Christopher F. Ackermann, Fairfax, VA (US); William G. Dubyak, Severna Park, MD (US); Edward Graham Katz, Washington, DC (US); Nicole O'Connor, Vienna, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 15/827,837

(22) Filed: Nov. 30, 2017

(65) Prior Publication Data
US 2019/0163811 A1    May 30, 2019

(51) Int. Cl.
*G06F 16/332* (2019.01)
*H04L 12/58* (2006.01)
*G10L 15/26* (2006.01)
*G06F 40/30* (2020.01)
*G06F 40/117* (2020.01)
(Continued)

(52) U.S. Cl.
CPC ........ *G06F 16/3329* (2019.01); *G06F 40/117* (2020.01); *G06F 40/295* (2020.01); *G06F 40/30* (2020.01); *G10L 15/265* (2013.01); *H04L 51/02* (2013.01); *G10L 2015/228* (2013.01)

(58) Field of Classification Search
None
See application file for complete search history.

(56) References Cited

U.S. PATENT DOCUMENTS 7,844,594 B1    11/2010   Holt et al.
9,229,974 B1 *   1/2016   Lee ......................... G06F 16/35
9,336,269 B1 *   5/2016   Smith ................... G06F 16/245
(Continued)

OTHER PUBLICATIONS

Klang, et al., "Named Entity Disambiguation in a Question Answering System", available at: https://www.wikidata.org, Sep. 2016, 3 pages.
(Continued)

*Primary Examiner* — Jonathan C Kim
(74) *Attorney, Agent, or Firm* — Tutunjian & Bitetto, P.C.; Nicole Spence

(57) ABSTRACT

A computer-implemented method, a computer program product, and a computer processing system are provided. The method includes identifying, by a processor using a topic identification system, topic information for a source topic-domain in a corpus. The method further includes extracting, by the processor, an entity from the source topic-domain. The method also includes tagging, by the processor, the entity with the topic information to obtain a tagged entity that includes a tag specifying the topic information. The method additionally includes storing the tagged entity in a memory device. The method further includes performing, by the processor, downstream processing of the tagged entity in a natural language processing pipeline using the tag of the tagged entity as an additional data point.

16 Claims, 5 Drawing Sheets

(51) Int. Cl.
*G06F 40/295* (2020.01)
*G10L 15/22* (2006.01)

(56) References Cited

U.S. PATENT DOCUMENTS

| | | | | |
|---|---|---|---|---|
| 9,373,086 B1* | 6/2016 | Allen | | G06F 16/24522 |
| 9,495,481 B2 | 11/2016 | Brown et al. | | |
| 9,542,496 B2 | 1/2017 | Dettman et al. | | |
| 2009/0192968 A1* | 7/2009 | Tunstall-Pedoe | | G06N 5/02 |
| | | | | 706/47 |
| 2011/0231347 A1* | 9/2011 | Xu | | G06F 16/951 |
| | | | | 706/12 |
| 2012/0078888 A1* | 3/2012 | Brown | | G06F 16/24578 |
| | | | | 707/723 |
| 2012/0109966 A1* | 5/2012 | Liang | | G06F 16/338 |
| | | | | 707/740 |
| 2012/0189988 A1* | 7/2012 | Brown | | G06F 16/3329 |
| | | | | 434/156 |
| 2014/0032529 A1* | 1/2014 | Chang | | G06F 16/248 |
| | | | | 707/722 |
| 2014/0344261 A1* | 11/2014 | Navta | | G06F 16/951 |
| | | | | 707/723 |
| 2014/0372102 A1* | 12/2014 | Hagege | | G06F 40/295 |
| | | | | 704/9 |
| 2015/0088888 A1* | 3/2015 | Brennan | | G06F 16/38 |
| | | | | 707/737 |
| 2015/0161242 A1* | 6/2015 | Visotski | | G06F 16/3344 |
| | | | | 707/730 |
| 2015/0269139 A1* | 9/2015 | McAteer | | G06F 16/367 |
| | | | | 704/9 |
| 2015/0286723 A1* | 10/2015 | Sun | | G06F 40/295 |
| | | | | 707/706 |
| 2015/0324456 A1* | 11/2015 | Kim | | G06N 5/00 |
| | | | | 707/722 |
| 2016/0055155 A1* | 2/2016 | Allen | | G06F 16/3331 |
| | | | | 707/749 |
| 2016/0110360 A1* | 4/2016 | Lee | | G06F 16/338 |
| | | | | 707/723 |
| 2016/0132590 A1* | 5/2016 | Byron | | G06F 16/3329 |
| | | | | 707/734 |
| 2016/0171092 A1* | 6/2016 | Mueller | | G06F 40/197 |
| | | | | 707/741 |
| 2016/0196336 A1* | 7/2016 | Allen | | G06F 16/9535 |
| | | | | 707/734 |
| 2017/0109355 A1* | 4/2017 | Li | | G06N 3/0445 |
| 2017/0243107 A1* | 8/2017 | Jolley | | G06N 5/02 |

OTHER PUBLICATIONS

Anonymous, "A System for Extracting and Analysing Tags and Sentiment Scores from Unstructured Text", An IP.com Prior Art Database Technical Disclosure, IP.com No. IPCOM000205102D, Mar. 2011, 5 pages.

Anonymous, "Determining a Level of Importance of an Entity", An IP.com Prior Art Database Technical Disclosure, IP.com No. IPCOM000198123D, Jul. 2010, 39 pages.

IBM et al., "A System & Method to Identify Correct Candidates for Question Answering over Structured Knowledge", An IP.com Prior Art Database Technical Disclosure, Mar. 2009, 4 pages.

* cited by examiner

TAGGING NAMED ENTITIES WITH SOURCE DOCUMENT TOPIC INFORMATION FOR DEEP QUESTION ANSWERING

BACKGROUND

Technical Field

The present invention relates generally to information processing and, in particular, to tagging named entities with source document topic information for deep question answering.

Description of the Related Art

Interpretation of ambiguous language is the central problem in Natural Language Processing (NLP). Human language is inherently nuanced and ambiguous. It is virtually impossible to extract meaning from a character string without good contextual information. Almost every technique applied in NLP targets reduction of ambiguity for discerning meaning from a character string. Named entities are not immune to the problem of ambiguity, hence the problem of Named Entity Disambiguation. A well-known case is the name "Michael Jordan", which can refer three famous people: Michael Jordan the basketball player, Michael Jordan the actor, and Michael Jordan the Computer Scientist at UC Berkeley. There are many similar cases, including "Paris Hilton" (the actress and the hotel) and "Washington" (the city and the president).

One of the problems of deep question answering is that the answers produced are sometimes ambiguous and therefore less informative than they might be. For example, if a user asks "Whose biography was ghost written by John Smith?" and the answer is "Michael Jordan", such an answer is perhaps less informative than an answer such as "Michael Jordan (Sports)" would be.

In addition, another problem associated with deep question answering is the problem of extensive domain adaptation which, in turn, implicates the problem of type coercion answer-scoring. Type coercion answer-scoring can be minimized by significant domain adaptation, in the sense of lexicon creation, but this is a significant problem for deep question answering as it requires significant hand annotation and preprocessing. For example, we would need to have "Michael Jordan" on the basketball player list of named entities to properly score "Michael Jordan" as an answer to a question such as "Which basketball player holds the leading career scoring average title?". Topic annotation of answer candidates provides a way of scoring answers with respect to semantic domain without the detailed domain adaptation that has been required in the past. Even if "Michael Jordan" is not on our basketball player list, having the answer candidate "Michael Jordan" tagged with the topic of the article from which it is extracted (and merged) (e.g., Sports/Basketball), would provide the system with a way of doing reasonable type coercion based scoring.

The problem of Named Entity Disambiguation has been explored well in the literature of Natural Language Processing, and there many perspectives on methods to resolve the specific reference. Most of the conventional approaches map a mention to a real world entity presented in a knowledge base of some sort (Wikipedia®, YAGO®, and so forth) to disambiguate a particular reference.

There are also simple methods such as entity popularity, which assumes that the most frequent mention of an entity is most likely a manifestation of the same process that generated the current mention. Like many bag of words approaches, this can work well given its intrinsic simplicity.

Some methods rely on similarity metrics of the word sequence containing the entity, assuming that words surrounding a mention in the corpus will help resolve ambiguity. This method has been extended to make use of the coherence of topics as measured by Wikipedia® page links.

However, all these preceding methods rely on direct reference to entity mentions within a knowledge base and lack a desired focus in their recommendations. Hence, there is a need for an improved approach for overcoming the aforementioned problems such as the problem of Named Entity Disambiguation in deep question answering.

SUMMARY

According to an aspect of the present invention, a computer-implemented method is provided. The method includes identifying, by a processor using a topic identification system, topic information for a source topic-domain in a corpus. The method further includes extracting, by the processor, an entity from the source topic-domain. The method also includes tagging, by the processor, the entity with the topic information to obtain a tagged entity that includes a tag specifying the topic information. The method additionally includes storing the tagged entity in a memory device. The method further includes performing, by the processor, downstream processing of the tagged entity in a natural language processing pipeline using the tag of the tagged entity as an additional data point.

Advantageously, the use of the tag of the tagged entity provides additional information (topic information) to improve the results provided to a question. Moreover, such use can, in turn, be used to improve the results provided by a deep question answering system. Additionally, such use can assist in disambiguating the entity.

In an embodiment, the performing step of the aforementioned method includes generating an answer candidate from the source topic-domain, wherein the answer candidate includes the tagged entity. The performing step further includes merging the tagged entity with other answer candidates to obtain merged answers. The performing step also includes using the tag to rank and score the tagged entity as compared to the other answer candidates to obtain updated merged answers. The performing step additionally includes returning the updated merged answers, including the tagged entity that includes the tag.

Advantageously, the preceding constituent steps of the performing step allow for answer merging and scoring in order to provide an optimized answer supplemented by topic information.

In an embodiment, the source topic-domain includes a textual structure selected from the group consisting of a document, a section, a paragraph, and a sentence.

Advantageously, the source topic-domain can have any level of granularity, based on user needs and the implementation. In this way, flexible is afforded for application to many different source topic-domains.

In an embodiment, the method further includes scoring the updated merged answers based on tags corresponding to, and included therewith.

Advantageously, the aforementioned scoring allows for the best fitting tags to be determined for a particular application.

According to another aspect of the present invention, a computer program product is provided. The computer program product includes a non-transitory computer readable storage medium having program instructions embodied therewith. The program instructions are executable by a computer to cause the computer to perform a method. The method includes identifying, by a processor using a topic identification system, topic information for a source topic-domain in a corpus. The method further includes extracting, by the processor, an entity from the source topic-domain. The method also includes tagging, by the processor, the entity with the topic information to obtain a tagged entity that includes a tag specifying the topic information. The method additionally includes storing the tagged entity in a memory device. The method further includes performing, by the processor, downstream processing of the tagged entity in a natural language processing pipeline using the tag of the tagged entity as an additional data point.

Advantageously, the preceding computer program product provides similar advantages as the aforementioned method above.

According to yet another aspect of the present invention, a computer processing system is provided. The computer processing system includes a processor. The processor is configured to identify, using a topic identification system, topic information for a source topic-domain in a corpus. The processor is further configured to extract an entity from the source topic-domain. The processor is also configured to tag the entity with the topic information to obtain a tagged entity that includes a tag specifying the topic information. The processor is additionally configured to store the tagged entity in a memory device. The processor is further configured to perform downstream processing of the tagged entity in a natural language processing pipeline using the tag of the tagged entity as an additional data point.

Advantageously, the preceding system provides similar advantages as the aforementioned method above.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to tagging named entities with source document topic information for deep question answering.

In an embodiment, the present invention provides a method to leverage topic tags on extracted names to improve a deep question answering system. The present invention can accrue significant advantages without incurring additional processing expense at runtime and provide users with additional information.

In an embodiment, the present invention provides a mechanism to use document topic information to tag extracted named entities, so that downstream processing includes an additional data point. The present invention is novel in that it has no reliance on external sources for amplifying information about the entity. In an embodiment, it is suggested to update the record of a named entity, extracted from text by some mechanism, with topic information extracted from the same document and making use of this in a question answering pipeline, as will be described in further detail herein below.

To be clear, by "topic" we mean the main idea discussed in the segment of text from which the entity was extracted. This segment can be adjusted to provide different levels of granularity. For example, a topic can be identified for a sentence, a paragraph, or an entire document.

Topics themselves are a configurable parameter depending on the needs of users. In the simplest manifestation, topics can be thought of as semi-stable distributions of terms in a document. This reduces the problem of topic identification to a simple word count model (with appropriate adjustments to weight based on Term-Frequency-Inverse Term Frequency (TF-IDF) or +boosts, driven by domain specific content). "Sports" topic articles have one distribution of words, while "cinema" topic articles have another.

In an embodiment, the present invention focuses on a modification to the entity extraction process to facilitate other NLP processes downstream from extraction and to improve informativeness of the output. These and other advantages of the present invention are readily apparent to one of ordinary skill in the art, given the teachings of the present invention provided herein, while maintaining the spirit of the present invention.

Figure 1:
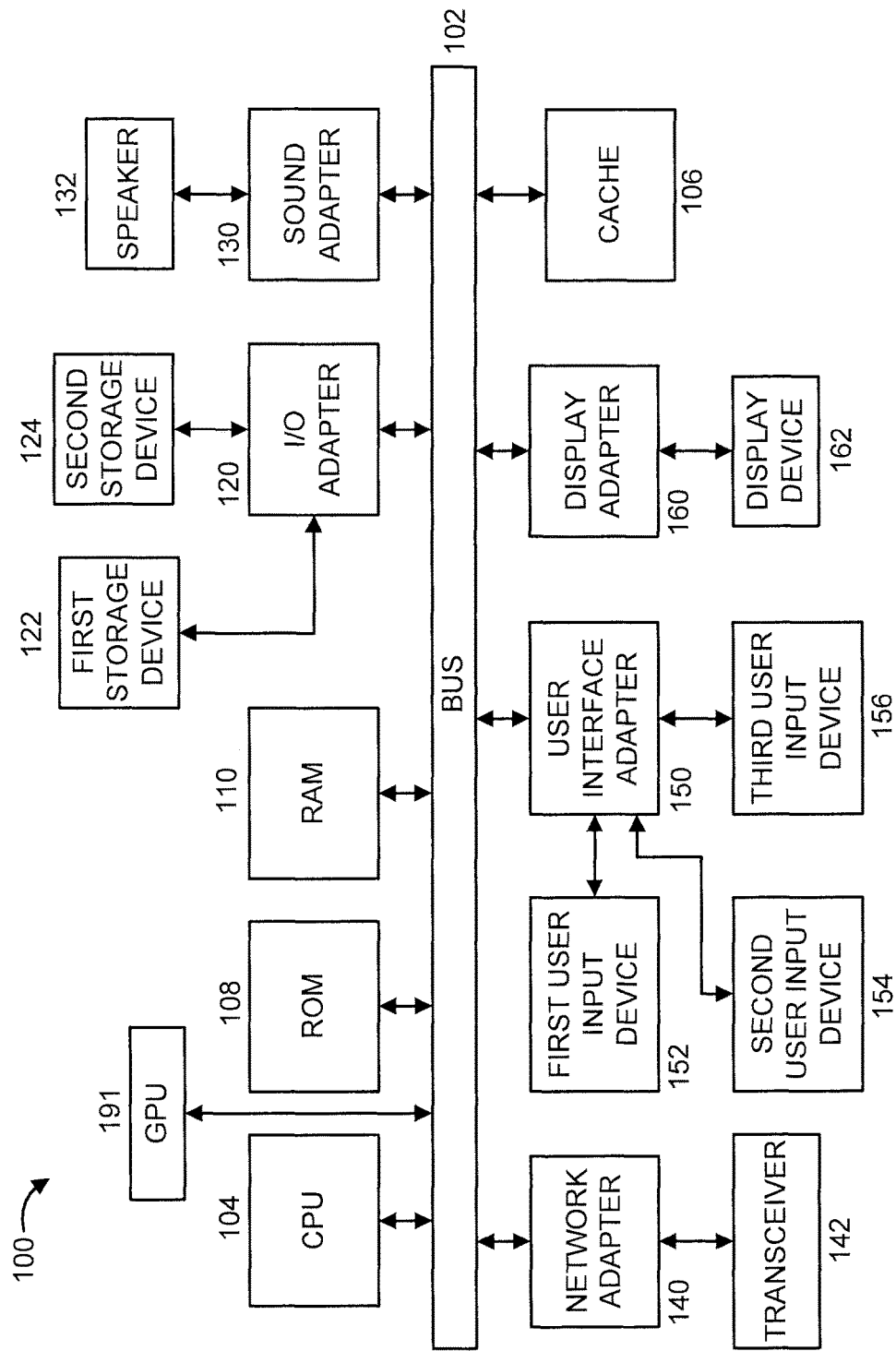
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
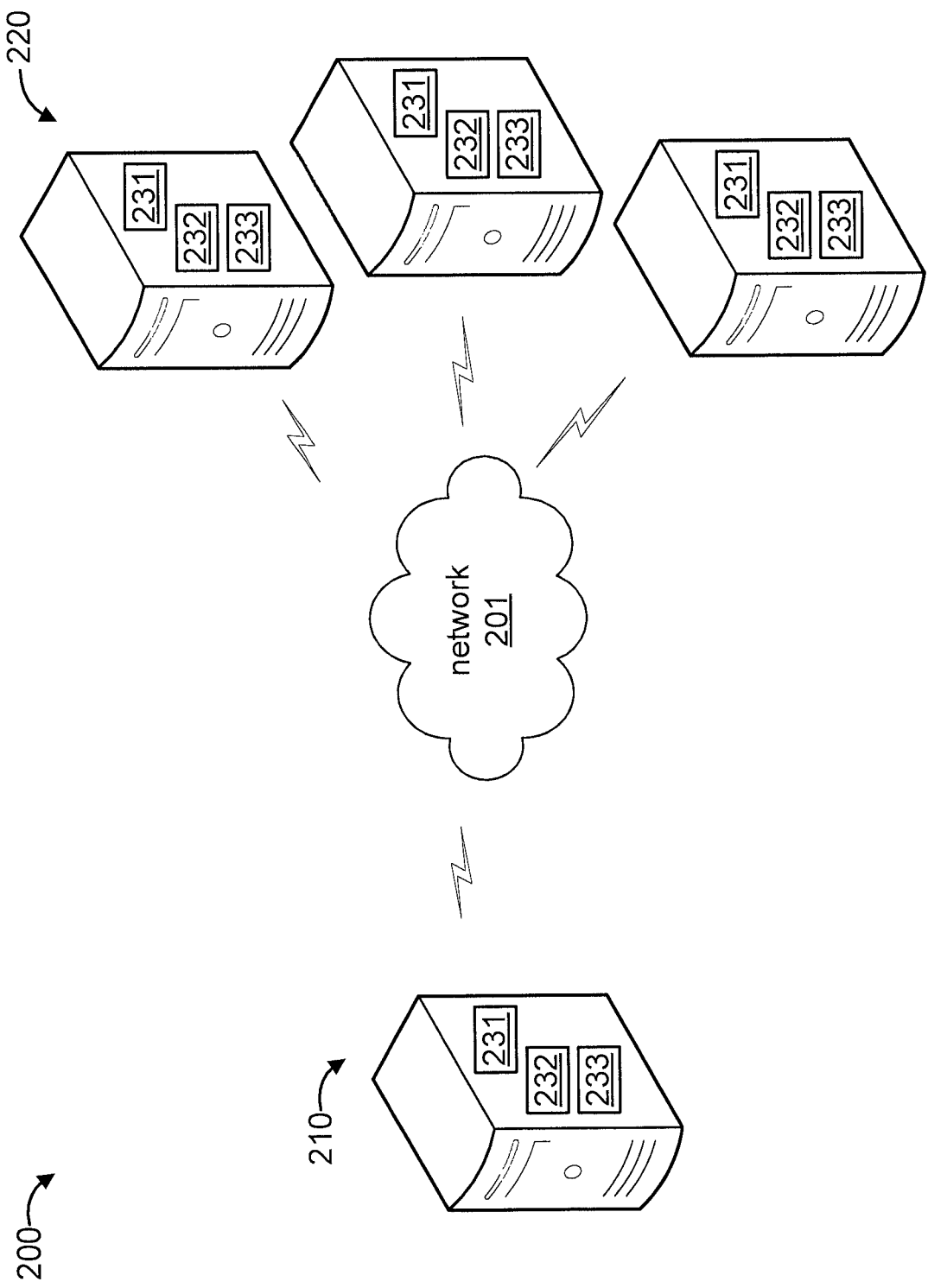
FIG. 2 is a block diagram showing an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
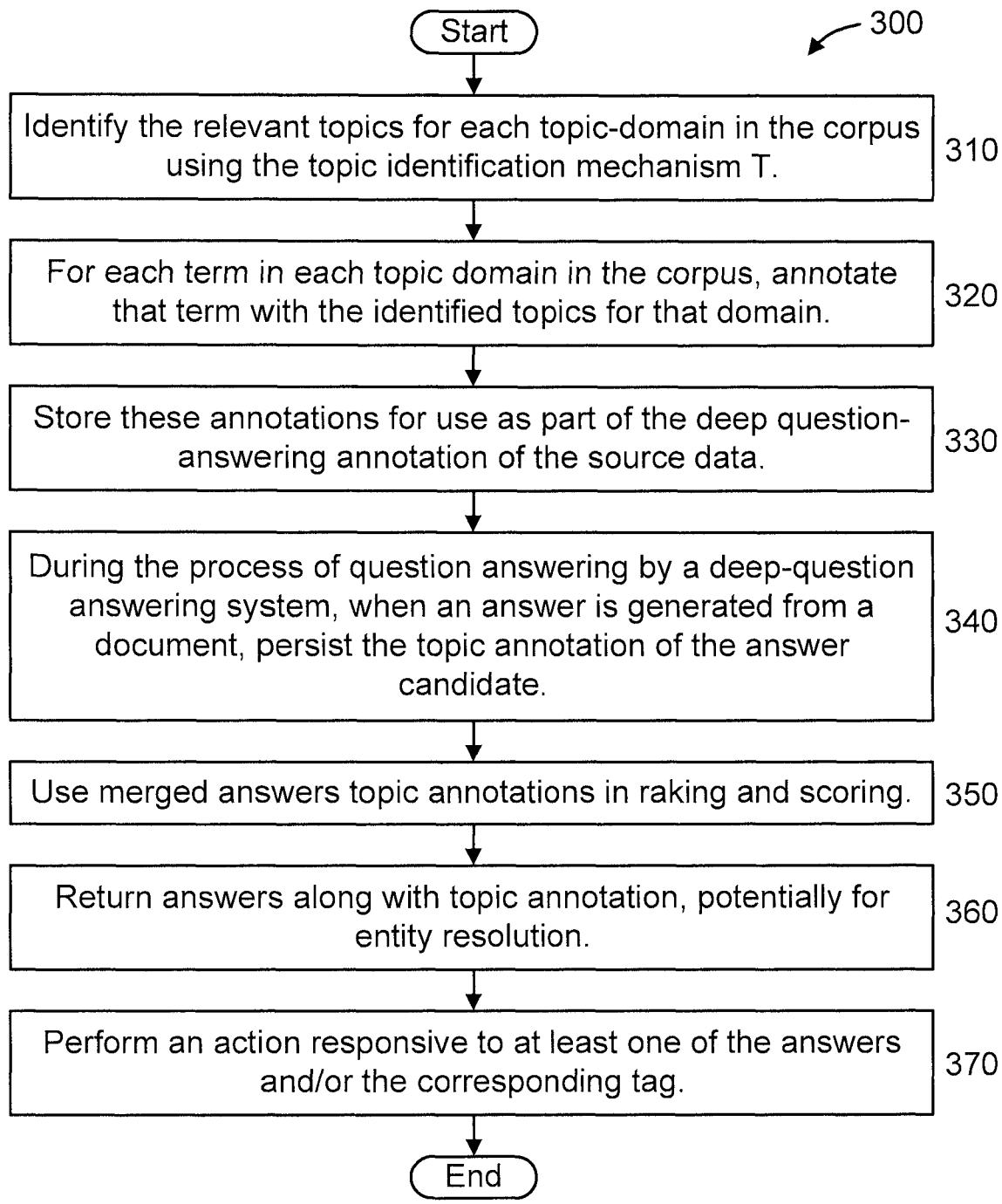
FIG. 3 shows an exemplary method for tagging named entities with source document topic information for deep question answering, in accordance with an embodiment of the present invention.

Further, it is to be appreciated that processing system 100 may perform at least part of the method described herein including, for example, at least part of method 300 of FIG. 3. Similarly, part or all of environment 200 may be used to perform at least part of method 300 of FIG. 3.

FIG. 2 is a block diagram showing an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes a computing node 210 operatively coupled to a set of computing nodes (e.g., servers, providers of services, etc.) 220.

Each of the computing node 210 and the computing nodes 220 at least include a processing element 231, a memory 232, and a communication device 233. The communication device 233 can be, for example, but is not limited to, a wireless transceiver, an Ethernet adapter, a Network Interface Card (NIC), and so forth.

The computing node 210 can be configured to tag named entities with source document topic information for deep question answering. To that end, the computing nodes 220 can serve as sources of information and thus, store one or more corpuses. The one or more corpuses can be stored by one of the computing nodes 220 or more than one in a distributed fashion. Moreover, in an embodiment, at least one of the computing nodes can be controlled in some fashion responsive to the tagging performed by computing node 210. That is, depending on the tag and the implementation, different actions can be performed. For example, for a question relating to a problem with a hardware-based device (e.g., one of computing nodes 220 or some other device), the corresponding answer and tag may reveal that the hardware-based device is likely infected with a virus. Accordingly, based on the tag (in parenthesis) in, for example, "computer stalling (virus)", an antivirus program may be automatically executed. As another example, perhaps the tag can indicate the following: "unknown person (intruder)". In such a case, the tag can cause the computing node 210 to control a remote door or other device to keep someone out or lock someone in. These and other examples are readily determined by one of ordinary skill in the art, given the teachings of the present invention provided herein, while maintaining the spirit of the present invention.

The tag advantageously can be used to disambiguate a named entity extracted from a text document in a corpus, by reflecting the topic of the document from which the entity was extracted, thus providing additional information for disambiguation.

The computing node 210 and/or any of the computing nodes 220 can be and/or otherwise include any type of computer processing system or device such as, but not limited to, servers, desktops, laptops, tablets, smart phones, media playback devices, and so forth, depending upon the particular implementation. For the sake of illustration, the computing node 210 and the computing nodes 220 are servers.

The computing node 210 can be configured to perform an action (e.g., a control action) on a controlled system, machine, and/or device responsive to a ranking list of passages (e.g., responsive to the top-ranked passage). The controlled system, machine, and/or device can be one of the computing nodes 220 or some other system, machine, and/or device.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

In an embodiment, the present invention provides a straightforward integration of information already in a QA pipeline to disambiguate a named entity extracted from a text document in a corpus.

Briefly, the point is to add a meta-data tag to the named entity at the point of its extraction from a document. This metadata tag would reflect the topic of the document from which the entity was extracted; these topics are routinely extracted when the document is ingested.

In this context, the term "document" can refer to an entire document, a passage, or a text snippet. The important thing is to match named entity to the topic of its source. (The choice of what, precisely, constitutes a document will be a choice for the system owner, and not necessarily individual users). The added data "follows" the entity through the entire NLP pipeline.

In effect, these tags provide an additional +vote, on the most likely sense of a named entity. If the topic indicates the name &Michael Jordan8 is drawn from a document whose topic is computer science, then the name is likely the Berkeley scholar. The opposite is true if the document is about basketball. The same logic applies to the word Texas, which could be the state, the UT Football Team, or the novel by Michener.

All this information is available in the processing pipeline. In an embodiment, the present invention routinely associates document topic tags with named entities to facilitate informative answer generation.

FIG. 3 shows an exemplary method 300 for tagging named entities with source document topic information for deep question answering, in accordance with an embodiment of the present invention. In an embodiment, method 300 is performed given a specification of topic-domain (document, section, paragraph, sentence) and a topic-identification mechanism T (e.g., topic modelling method) and a corpus-based deep-question answering system.

At step 310, identify the relevant topics for each topic-domain in the corpus using the topic identification mechanism T.

At step 320, for each term in each topic domain in the corpus, annotate that term with the identified topics for that domain.

At step 330, store these annotations for use as part of the deep question-answering annotation of the source data.

At step 340, during the process of question answering by a deep-question answering system, when an answer is generated from a document, persist the topic annotation of the answer candidate.

At step 350, when merging like answer candidates also merge their topic annotations.

At step 360, use merged answers topic annotations in raking and scoring.

At step 370, return answers along with topic annotation, potentially for entity resolution.

At step 380, perform an action responsive to at least one of the answers and/or the corresponding tag. For example, in the case where the question relates to a problem with a hardware-based processing device (e.g., computer, media player, phone, tablet, etc.), the system can be configured to automatically (or responsive to a user input) act upon the answers and/or tags to cure the problem. Hence, the action can be a curative action. The action can involve, but is not limited to, executing an antivirus program, locking a door for security purposes (to keep someone in or out of an area), purchase an item, disabling a faulty component, activating a backup component to replace the faulty component, automatically completing a form, answer scoring, and so forth. As is readily appreciated by one of ordinary skill in the art, the preceding actions are merely illustrative and, thus, other actions can be performed depending upon the implementation.

At least some of the advantages of method 300 lie in the ability to provide more informative answers (than just a possibly ambiguous string) and to provide semantic scoring for answers without extensive domain adaptation.

For the sakes of illustration and clarity, an example relating to method 300 will now be described, in accordance with an embodiment of the present invention.

The method is perhaps best described by example. So consider the following (miniature) example.

At ingest the topics for each document (here taken to be the topic domain) would be annotated with topic labels. We take the example of the Michal Jordan question above "Whose biography did John Smith write?". For sake of illustration, presume that in our corpus, there is a small set of relevant documents, namely these three very small documents:

(1) Michael Jordan was intent on getting his basketball exploits down for history. John Smith wrote Jordan's biography. (sports, history)
(2) There isn't much to say about Jordan's acting. Like Smith, his biography is a bit slim. (acting, books)
(3) Jordan (basketball's most well-known name) has a great biography by Smith. (sports, books)

As part of the ingestion processing each of the named entities in the above documents would be annotated with the Topic or Topics of the document. This is the first part (steps 310-330 of method 300).

In response to the question: "Whose athletic biography did John Smith write?" the extracted answers are annotated with the appropriate topic label.

The following answers instances are extracted from each document:

(1) Michael Jordan was intent on getting his basketball exploits down for history. John Smith wrote Jordan's biography. (sports, history)
Jordan (sports, history)
(2) There isn't much to say about Jordan's acting. Like Smith, his biography is a bit slim. (acting)
Jordan (acting)
(3) Jordan (basketball's most well-known name) has a great biography by Smith. (sports, books)
Jordan (sports)

This is step 340 of method 300.

At answer merging, the topic-sensitive merging process results in a topic annotated candidate answers: Jordan (sports) and Jordan (acting). This is step 5 of the method.

At stop 6 semantic scorers might rank Jordan (sports) (because of the question word "athletic") ahead of Jordan (acting).

Finally in the display step, the topic annotated answers underlie a more informative display, either through direct display—as "Jordan (sports)"—or as input to an indexed resource (such as a Wikipedia® page or other structured resource), serving as the basis of an entity linking. In some embodiment we might imagine that the final entity+topic merge serves as input.

The topic annotation plays the following important roles, that we would like to underscore:

Answer Scoring:

In a typical deep question answering system, after candidate answers have been identified the answers are scored based on the information contained in the question and information about the answer and the context that it appears in. Given topic annotation of named entities as part of the pipeline, this tagging can be leveraged throughout the scoring process.

For example, when a question is about accommodations in Paris, award higher scores for the answer "Paris Hilton" if it was extracted from a document with the topic "hotels". For a question about computer science research, award a higher score to the named entity "Michael Jordan", if it was drawn from an article about Machine Learning.

Please note that we are not suggesting any deeper reasoning about entities that are answer candidates. Rather, we simply offer an additional piece of metadata to inform the scoring process.

Answer Merging:

In a typical deep question answering system, after candidate answers have been identified, like candidate answer occurrences are merged. This can result in problematic merging of Names of entities that are NOT the same entity, resulting in incorrect scoring of the merged answers. By maintaining topic tagging ambiguous names which come from topically distinct documents and therefore likely refer to different entities are kept distinct.

Answer Disambiguation:

Once an answer is identified, it may not, in the case of an ambiguous entity name, be as informative as it might be. Although the answer to our leading question above is "Jordan", it would be more informative to present additional information in a compact form that will allow the user (or perhaps another system) to identify more exactly the entity being named (in this case &Jordan (sports)8 tells us who is being referred to more completely.

Advantage Over Prior Art:

The present invention advantageously adds document topic tags as metadata on a named entity extracted from a document as part of a deep question answering system. Leveraging this information establishes context around the entity, which in most cases will allow the system to score answers more effectively and to present information leading to the determination of which sense of the named entity the system is, in fact, answering with.

It will be especially useful in two circumstances:
(1) In large corpora, with many domains, it is far more likely that an ambiguous name reference will be hard to resolve. Despite the frequency of its use as an exemplar case, there are few corpora including references to both Michael Jordans.
(2) In corpora with more obscure named entities, where there is nothing like a Wikipedia page to support resolution, the inclusion of source-derived topical information will provide the context needed for users to determine which entity is needed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
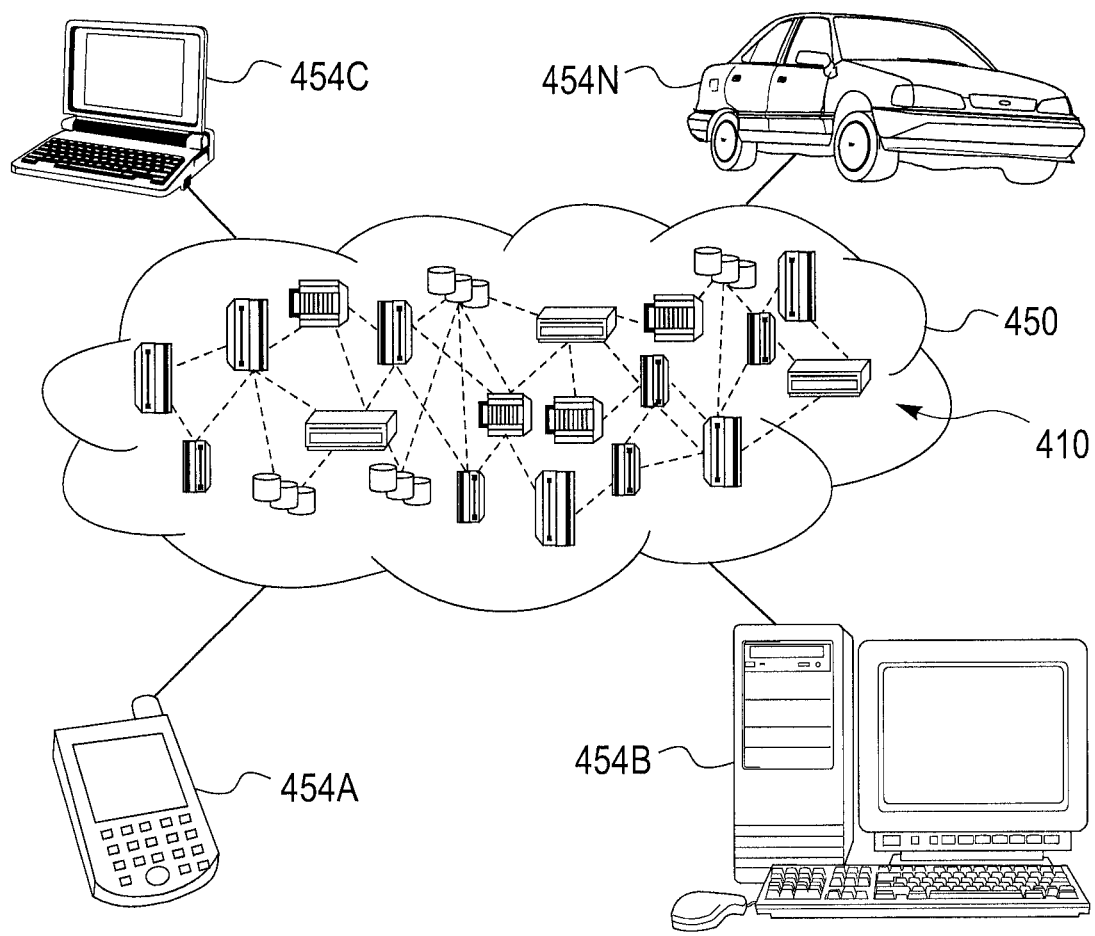
FIG. 4 shows a cloud computing environment, in accordance with an embodiment of the present invention.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
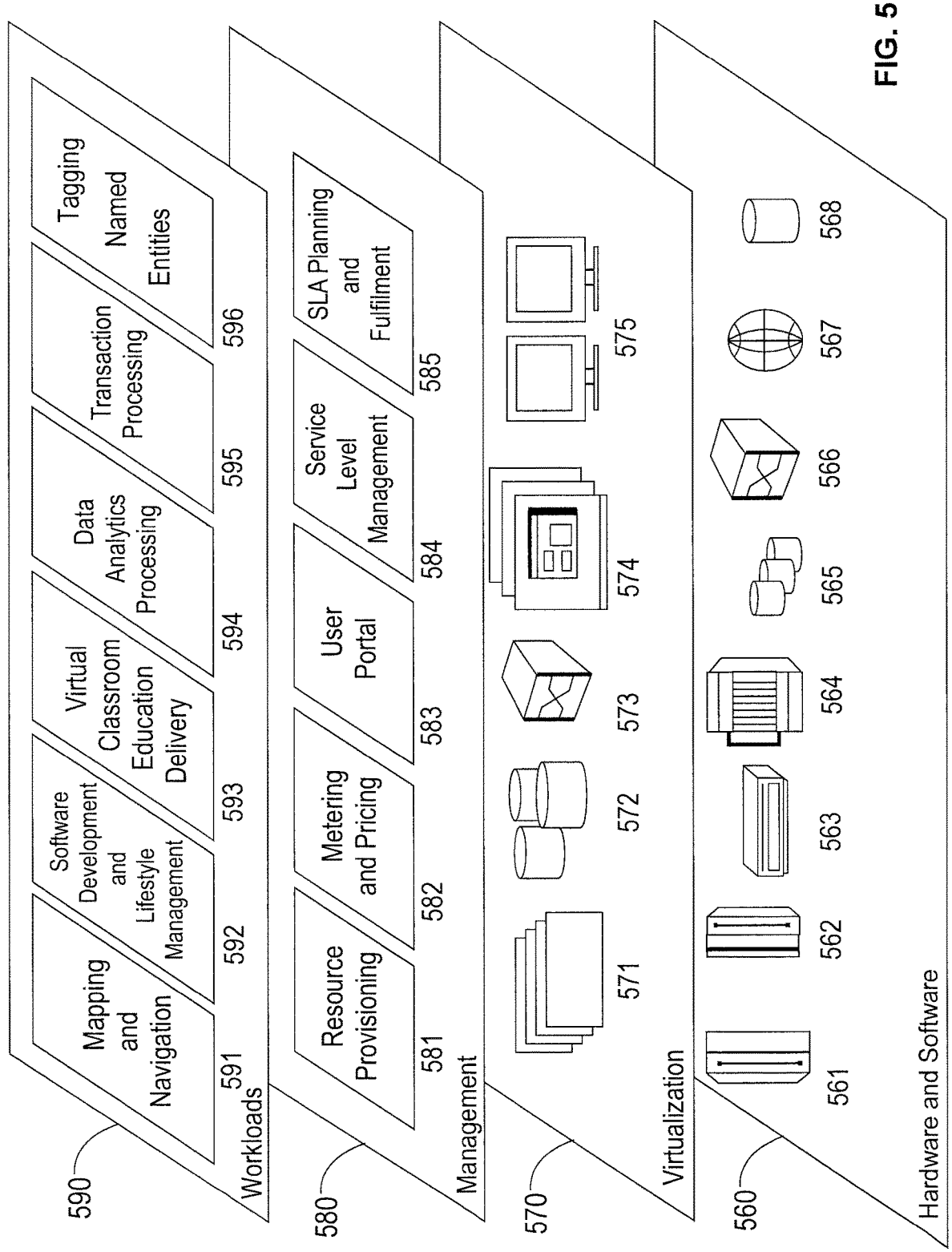
FIG. 5 shows abstraction model layers, in accordance with an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and tagging named entities with source document topic information for deep question answering 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method, comprising:
   identifying topic information for a source topic-domain in a corpus;
   extracting an entity from the source topic-domain, and tagging the entity with the topic information to obtain a tagged entity that includes a tag specifying the topic information; and
   performing, by a processor, entity disambiguation for downstream processing of the tagged entity in a natural language processing pipeline using the tag of the tagged entity as an additional data point to disambiguate the tagged entity from among various potential entities,
   wherein said performing step comprises:
      generating an answer candidate from the source topic-domain, wherein the answer candidate includes the tagged entity;
      conjunctively merging the tagged entity with other answer candidates, including merging ones of the answer candidates having at least one same word and also merging their tags specifying the topic information all together in a single string, to obtain merged answers;
      automatically using the tag by the processor to rank and semantically score the tagged entity as compared to the other answer candidates based on semantically supporting context words appearing in the corpus to obtain updated merged answers, responsive to said conjunctively merging step; and
      returning, on a display device, the updated merged answers, including the tagged entity that includes the tag.

2. The computer-implemented method of claim 1, wherein the topic identification system includes a topic modeling method.

3. The computer-implemented method of claim 1, wherein the source topic-domain includes a textual structure selected from the group consisting of a document, a section, a paragraph, and a sentence.

4. The computer-implemented method of claim 1, wherein the tag is a metadata tag.

5. The computer-implemented method of claim 1, wherein the method is performed by a deep question answering system that comprises the processor.

6. The computer-implemented method of claim 1, further comprising scoring the updated merged answers based on tags corresponding to, and included therewith.

7. The computer-implemented method of claim 1, wherein said conjunctively merging step comprises merging the tagged entity with the other answer candidates to obtain merged answers using a conjunction.

8. The computer-implemented method of claim 1, further comprising entity linking a final merge resulting in the single string to a remote structured informational resource.

9. A computer program product, the computer program product comprising a non-transitory computer readable storage medium having program instructions embodied therewith, the program instructions executable by a computer to cause the computer to perform a method comprising:
identifying topic information for a source topic-domain in a corpus;
extracting an entity from the source topic-domain, and tagging the entity with the topic information to obtain a tagged entity that includes a tag specifying the topic information; and
performing, by a processor, entity disambiguation for downstream processing of the tagged entity in a natural language processing pipeline using the tag of the tagged entity as an additional data point to disambiguate the tagged entity from among various potential entities,
wherein said performing step comprises:
generating an answer candidate from the source topic-domain, wherein the answer candidate includes the tagged entity;
conjunctively merging the tagged entity with other answer candidates, including merging ones of the answer candidates having at least one same word and also merging their tags specifying the topic information all together in a single string, to obtain merged answers;
automatically using the tag by the processor to rank and score the tagged entity as compared to the other answer candidates based on semantically supporting context words appearing in the corpus to obtain updated merged answers, responsive to said conjunctively merging step; and
returning, on a display device, the updated merged answers, including the tagged entity that includes the tag.

10. The computer program product of claim 9, wherein the topic identification system includes a topic modeling method.

11. The computer program product of claim 9, wherein the source topic-domain includes a textual structure selected from the group consisting of a document, a section, a paragraph, and a sentence.

12. The computer program product of claim 9, wherein the tag is a metadata tag.

13. The computer program product of claim 9, wherein the computer is a deep question answering system that comprises the topic identification system and is configured to perform the method.

14. The computer program product of claim 9, wherein the method further comprises scoring the updated merged answers based on tags corresponding to, and included therewith.

15. A computer processing system, comprising:
a processor, configured to
identify topic information for a source topic-domain in a corpus;
extract an entity from the source topic-domain, and tag the entity with the topic information to obtain a tagged entity that includes a tag specifying the topic information; and
perform entity disambiguation for downstream processing of the tagged entity in a natural language processing pipeline using the tag of the tagged entity as an additional data point to disambiguate the tagged entity from among various potential entities, wherein the processor performs the entity disambiguation to:
generate an answer candidate from the source topic-domain, wherein the answer candidate includes the tagged entity;
conjunctively merge the tagged entity with other answer candidates, including merging ones of the answer candidates having at least one same word and also merging their tags specifying the topic information all together in a single string, to obtain merged answers;
use the tag to rank and score the tagged entity as compared to the other answer candidates based on semantically supporting context words appearing in the corpus to obtain updated merged answers, responsive to a conjunctive merging of the tagged entity with the other answer candidates; and
return, on a display device, the updated merged answers, including the tagged entity that includes the tag.

16. The computer processing system of claim 15, wherein the computer processing system is a cloud-based deep question answering system.

* * * * *